June 21, 1966   K. BAUMANN ETAL   3,256,917

NONRETURN VALVE WITH PRESSURE RELEASE

Filed Jan. 31, 1963

United States Patent Office 3,256,917
Patented June 21, 1966

3,256,917
NONRETURN VALVE WITH PRESSURE RELEASE
Kurt Baumann, Blucherstrasse 37, and Klaus Buss, Untern Hohscheid 20, both of Solingen, Germany
Filed Jan. 31, 1963, Ser. No. 255,303
Claims priority, application Germany, Feb. 1, 1962,
W 31,586
2 Claims. (Cl. 141—295)

The filling or refilling of gas fueled lighters with liquified gas under pressure is effected from a charging reservoir the content of which is a multiple of the content of the gas container to be filled. In order to hasten the filling operation it is necessary to release the gas or air content in the lighter container to be filled, that is to maintain a lower pressure in the container to be filled than in the charging reservoir. The lighter container to be filled is therefore provided with a release device for example a separate air release valve, a combined charging and release valve or a release passage is provided in the nozzle connected with the charging reservoir.

These release devices are in consequence expensive, they must have a very small flow cross section so that not too much fuel is lost at the instant of filling but at the same time they must be protected from the risk of blocking. The known discharge devices do not satisfy these requirements.

According to the invention in a nonreturn charging valve provided with a release device, suitable for a gas fueled lighter but also usable in other cases, a resilient sealing ring for the charging pipe is arranged outside the seating for the nonreturn valve member in particular a ball valve under spring pressure, which ring has a groove, slot or the like for pressure release.

This arrangement is simple and inexpensive, it can easily be changed if it becomes clogged and above all it has the advantage over the known arrangements in that the pressure release takes place very rapidly if a correspondingly large groove is provided but towards the end of the charging operation slows down on account of the resilience of the sealing ring and can finally be completely closed by a slight rotation of the charging pipe by which the groove is partly or entirely closed, or by a slightly inclined setting or a combined movement. Due to the resilience and the fact that the charging pipe is led frictionally through the seal clogging is hindered and due to the further fact that the grooves or slots or the like are open clogging particles can directly fall out.

To increase the possibility of adjusting the charging and release operation it has been found desirable to make the groove of V section with an angle of about 30° and the depth of the groove about 15% of the clear diameter of the seal and thus the same proportion of the outer diameter of the charging pipe but these advantageous proportions which relate to the usual value of the resilience for example of a rubber seal can be changed if some other sealing material with different resilience is used.

The invention can be used particularly economically if the sealing ring according to the invention for the charging pipe is combined with the sealing seat for the valve member of the charging valve that is in particular a ball valve under spring pressure, when it is desirable to give the double seal ring an L section; the perpendicularly inwardly directed portion of the ring is provided with the groove and serves as a sealing ring for the charging pipe while the axially directed portion serves as a seating ring for the valve member.

The invention will be further described with reference to an example illustrated in the accompanying drawing.

Figure 1:
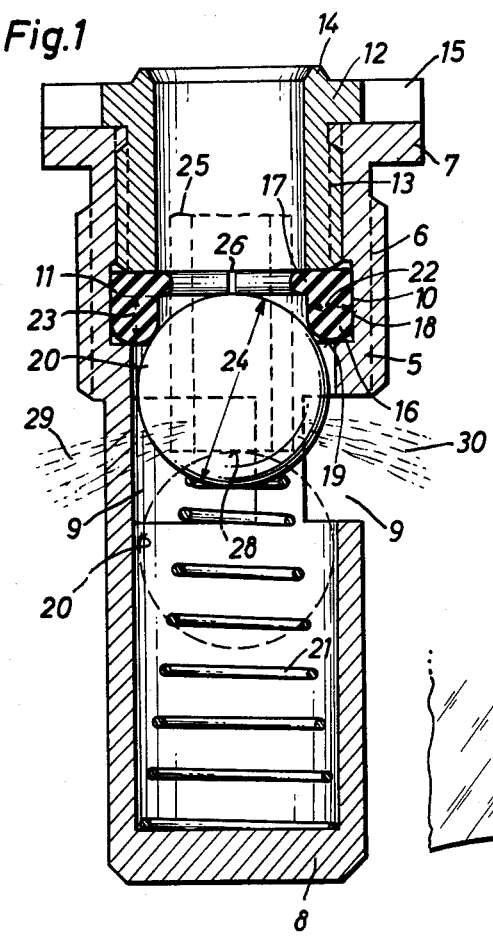
FIGURE 1 is a longitudinal section of a charging valve according to the invention.

The valve according to the invention comprises a valve casing 5, which by means of a thread 6 can be screwed into the bottom of a fuel container. Tightness is obtained by means of a sealing flange 7 and a sealing washer (not shown). The casing 5 is closed at its inner end by a bottom 8 and below the thread 6 has three openings 9 for the out-flow of liquified gas into the lighter container. The generally cylindrical interior of the casing has a chambered bore at 10 into which a double sealing ring 11 is introduced. This ring is held in its position by a nipple 12 which is screwed into a thread 13 in the casing 5, and has an annular sealing rib 14 for the charging cartridge to be set thereon and it can be tightened by the aid of radial slots 15. The double sealing ring 11 has an axially directed portion 16 and a radially directed portion 17. The external surface 18 of the former is cylindrical and bears against the chambered wall 10 of the casing. The end surface 19 of the portion 16 is semi-circular in section and serves as a seating for a ball 20 serving as a valve member and pressed by the action of a truncated conical spring 21 against the end surface 19. The breadth 22 of portion 16 is approximately equal to the height 23 and amounts to about ⅓ of the diameter 24 of the ball 20.

Figure 2:
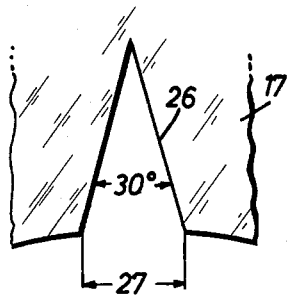
FIGURE 2 illustrates a groove in the sealing ring on a larger scale.

The height and breadth of the portion 16 of the ring are about twice those of the radial portion 17. This radial portion 17 in the illustrated example has a semicircular section at its inner periphery, the clear diameter of which is somewhat smaller than the external diameter of the charging or filling pipe 25, so that the latter is reliably sealed. Pressure release is effected through a groove 26 which is shown enlarged in FIGURE 2. The groove is of V section with a V angle of 30° and its breadth 27 is about 15% of the clear diameter of the radial portion 17.

The charging operation is effected by axial insertion of the charging pipe 25 which is thereby sealed to the casing by the radial portion 17 and with its inner end 28 engages the ball 20 and moves it into the dotted line position shown. Grooves are provided across the end surface of the charging pipe through which the liquified gas flows out in the streams 29, 30 through the openings 9 into the fuel container while at the same time the gas present in the container can escape through the groove 26.

Numerous modifications can be made in the construction. Thus instead of the groove of V section of some other section groove can be used. The sealing ring which is of rubber in the example can consist of some other material and the section shown can also be changed. The sealing surface of the double sealing ring can be provided on two separate rings mounted in different positions. The proportions can be changed. The valve seating surface can be provided in a separate insertion sleeve while the seal for the pipe is separate and located substantially further out. In the case of a V section groove though an angle of about 30° is preferred as above stated, it may be between 5° and 120°. Other possible sections are semi-circular, square, rectangular and dove-tail.

The distance of the upper edge of the openings 9 in the valve casing 5 from the internal wall of the fuel container must as a rule be so dimensioned that the container is only filled up to about ⅚ of its capactiy that is ⅙ remains as a safety volume. This proportion of charging is effected automatically because the release device according to the invention is inside the container.

What we claim is:

1. In a non-return valve assembly for use in supplying fuel under pressure from a reservoir therefor to a container in a lighter structure, a casing for connection to the reservoir and having at least one aperture therein for allowing fuel to pass into the container, a sealing ring of yieldable material within the casing and located between the connection to the reservoir and said at least one aperture, said ring being of uniform outer diameter and having an axially extending portion and an inwardly directed radial portion, a valve seat on the axially directed portion, a valve member within said casing normally resiliently urged against said valve seat, a filling pipe communicating with the reservoir and adapted to be inserted through said sealing ring, the inner diameter of said inwardly directed radial portion being less than the outer diameter of said filling pipe for producing a fluid tight seal between said pipe and ring, and said inwardly directed radial portion having at least one axially inner grove therein for providing a pressure release so that when the pipe is inserted through the ring a seal is effected between the pipe and the inwardly directed radial portion and the valve member is moved away from the seat on the axially directed portion for allowing fuel under pressure to pass through said at least one aperture into the container and any gas present in the container can escape through said at least one groove in the inwardly directed radial portion.

2. In a non-return valve assembly for use in supplying fuel under pressure from a reservoir therefor to a container in a lighter structure, a casing for connection to the reservoir and having at least one aperture therein for allowing fuel to pass into the container, a sealing ring of yieldable material within the casing and located between the connection to the reservoir and said at least one aperture, said ring being of uniform outer diameter and having an axially directed portion and an inwardly directed radial portion, a valve seat on the axially directed portion, a ball valve within the casing, resilient means normally urging the ball valve against the valve seat, the width and height of the axially directed portion being approximately twice the width and height of the inwardly directed radial portion and approximately one-fifth the diameter of the ball valve, a filling pipe communicating with the reservoir and adapted to be inserted through the sealing ring, the inner diameter of the inwardly directed radial portion being less than the outer diameter of the filling pipe for producing a fluid tight seal between the filling pipe and ring, said inwardly directed radial portion having at least one axially inner groove of V-shape with an angle of substantially 30° and a depth of about 15% of the sealing surface for providing a pressure release so that when the filling pipe is inserted through the ring, a seal is effected between the pipe and the inwardly directed radial portion and the ball valve is moved away from the seal for permitting fuel under pressure to pass through said at least one aperture into the container and any gas present in the container can escape through said at least one groove in the inwardly directed radial portion.

References Cited by the Examiner
UNITED STATES PATENTS

| | | | |
|---|---|---|---|
| 1,688,571 | 10/1928 | Zerk | 141—349 X |
| 2,682,281 | 6/1954 | Ecker | 251—361 X |
| 2,717,720 | 9/1955 | Nissen | 222—542 |
| 2,953,347 | 9/1960 | Phillips | 251—361 |
| 3,035,617 | 5/1962 | Breitenstein | 141—352 X |
| 3,115,907 | 12/1963 | Labat | 141—295 |

LAVERNE D. GEIGER, *Primary Examiner.*

E. EARLS, *Assistant Examiner.*